(12) United States Patent
Van Luchene

(10) Patent No.: US 8,226,472 B2
(45) Date of Patent: Jul. 24, 2012

(54) VIDEO GAME CAPABLE OF PROVIDING OFFERS TO PLAYERS

(75) Inventor: Andrew Van Luchene, Santa Fe, NM (US)

(73) Assignee: Leviathan Entertainment, LLC, Sante Fe, NM (US)

( * ) Notice: Subject to any disclaimer, the term of this patent is extended or adjusted under 35 U.S.C. 154(b) by 127 days.

(21) Appl. No.: 12/796,289

(22) Filed: Jun. 8, 2010

(65) Prior Publication Data

US 2011/0300923 A1 Dec. 8, 2011

(51) Int. Cl.
*G06F 17/00* (2006.01)
*A63F 13/00* (2006.01)

(52) U.S. Cl. .............................. 463/25; 463/42

(58) Field of Classification Search .................... 463/25, 463/42

See application file for complete search history.

(56) References Cited

U.S. PATENT DOCUMENTS

| 7,740,534 | B2* | 6/2010 | Walker et al. | 463/16 |
| 2003/0087652 | A1* | 5/2003 | Simon et al. | 455/466 |
| 2005/0153766 | A1* | 7/2005 | Harmon | 463/9 |
| 2005/0192097 | A1* | 9/2005 | Farnham et al. | 463/42 |
| 2006/0121990 | A1* | 6/2006 | O'Kelley et al. | 463/42 |
| 2006/0234795 | A1* | 10/2006 | Dhunjishaw et al. | 463/42 |
| 2007/0005466 | A1* | 1/2007 | Rosenblatt et al. | 705/35 |
| 2007/0265091 | A1* | 11/2007 | Aguilar et al. | 463/42 |
| 2008/0220876 | A1* | 9/2008 | Mehta et al. | 463/42 |
| 2008/0221998 | A1* | 9/2008 | Mendelsohn et al. | 705/14 |
| 2009/0228355 | A1* | 9/2009 | Dawson et al. | 705/14 |
| 2009/0305774 | A1* | 12/2009 | Farone et al. | 463/25 |

OTHER PUBLICATIONS

World of Warcraft Manual, 2004.*

* cited by examiner

*Primary Examiner* — Xuan Thai
*Assistant Examiner* — Michael Grant

(57) ABSTRACT

A video game can provide an offer to a player of the video game. For example, the video game can provide to the player an offer to receive a particular virtual item (a virtual object or a virtual service delivered in the video game) in exchange for a particular price. The time at which the offer is provided to the player can be governed by the status in the game of the player character of the player.

5 Claims, 4 Drawing Sheets

VIDEO GAME CAPABLE OF PROVIDING OFFERS TO PLAYERS

DETAILED DESCRIPTION

Figure 1:
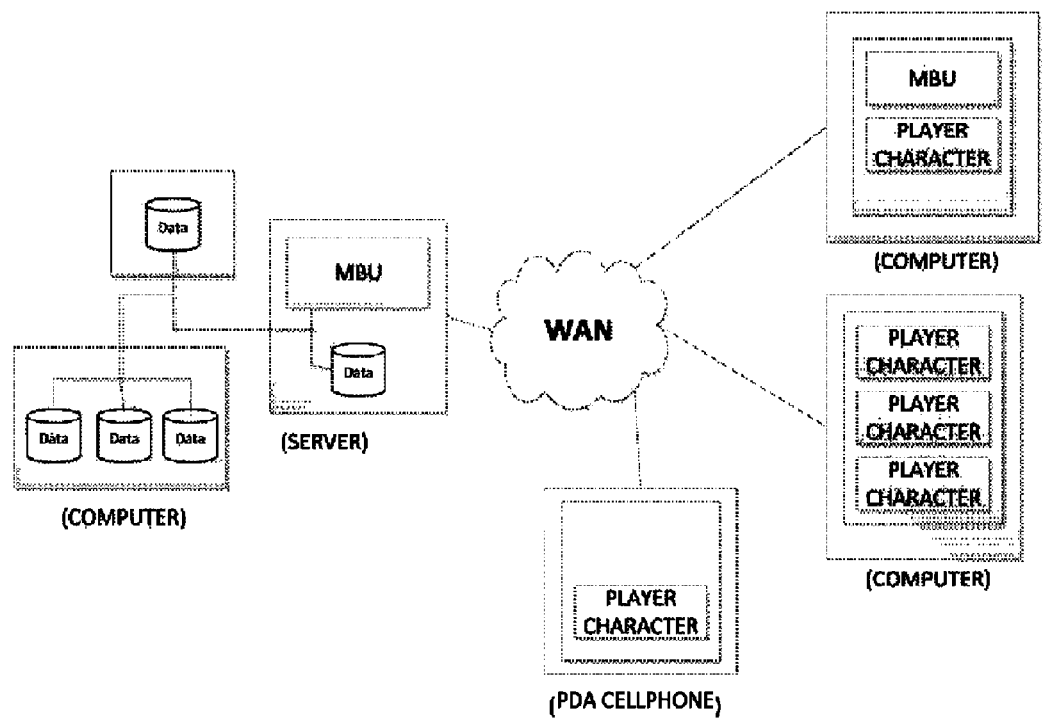
FIG. 1 depicts a network according to an embodiment.

The following sections I-X provide a guide to interpreting the present application.

I. Terms

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise. Two or more described embodiments may or may not be mutually exclusive. The mere fact that two embodiments are described, or that two embodiments are described in proximity to each other or in conjunction with each other, does not imply that the two embodiments are mutually exclusive. A described embodiment may or may not be strictly narrower than and encompassed by another described embodiment. The mere fact that two embodiments are described, or that two embodiments are described in proximity to each other or in conjunction with each other, does not imply that one of the embodiments is strictly narrower than and encompassed by the other embodiment.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments would cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well as another example, the sentence "Examples of machines include a computer and a motor" means that one example of a machine is a computer, another example of a machine is a motor, and there may be other examples (e.g., things that are neither computers nor motors may nevertheless be a machine)

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose" and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of", to be the only components of, or to be the only members of unless expressly specified otherwise. Thus, for example, the sentence "the red widget and the blue widget exclusively compose a machine" means the machine consists of the red widget and the blue widget (i.e. and nothing else).

The indefinite articles "a" and "an" and the definite article "the" refer to "one or more" of the noun modified by that article, unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the specific single feature," then the word "the" should be understood to refer to the previously mentioned "a specific single feature."

The term "plurality" means "two or more", unless expressly specified otherwise.

A "set" of things (e.g., a set of widgets) may include one or more of those things (e.g., one or more widgets), which are members of the set. Whether the set includes a particular item as a member is synonymous with whether a set includes the particular item.

A "subset" of things (e.g., a subset of widgets) may include one or more of those things. A subset does not imply that there must be in the subset fewer things than in some other set of things. A subset of a particular set may include some or all of the members of the set.

A reference to a "plurality" (and like terms such as "at least one", "one or more", "set" and the like) has inherent antecedent basis for the "number" of things included in the plurality (or in the set, etc.). For example, in the phrase "receiving a plurality of commands", there is inherent antecedent basis for "the number of commands". For example, in the phrase "receiving a set of commands", there is inherent antecedent basis for "the number of commands".

The term "herein" means "in the present application, including anything which may be incorporated by reference", unless expressly specified otherwise.

The phrase "at least one of" is equivalent to "one or more of", and when either such phrase modifies a plurality of things (such as an enumerated list of things), such phrase means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". Therefore, the phrase "based on" is equivalent to the phrase "based at least on" and is also equivalent to the phrase "based at least in part on". For example, the phrase "element A is based on element B and element C" covers embodiments where element A is calculated as the product of B times C (in other words, $A=B \times C$) and where A is calculated as the sum of B plus C (in other words, $A=B+C$).

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" precedes do not establish specific further limitations of the claim or otherwise restrict the meaning or scope of the claim.

The terms "e.g.", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "time", when used as a determined quantity, means any sort of time (e.g., time of day, day of week, date, year) on which one or more things are determined to occur.

The term "period of time" means any sort of duration (e.g., number of seconds, number of minutes, other durations) of one or more things.

The term "good" generally refers to anything which may be provided in exchange for money or other value, and thus "good" includes services, rights and items, whether tangible or intangible.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

Similarly, in the phrase "for each of the plurality of widgets, determining a respective price of the widget, a reference to "the widget" in that phrase means the "determining" step is applied to (performed for) each widget of the plurality of widgets. The phrase "the respective prices of the plurality of widgets" thus means the set which includes as members each respective price of the plurality of widgets.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers within the range, unless expressly specified otherwise. For example, the range "1 to 10" includes the integers from 1 to 10 (e.g., 1, 2, 3, 4, . . . 9, 10) and non-integers (e.g., 1.1, 1.2, . . . 1.9). A range may be denoted as non-inclusive explicitly, such as "the range of voltages from 2.5 volts to 10.3 volts exclusive", and such a range excludes 2.5 volts and excludes 10.3 volts.

A range can be continuous or discrete. For example, the range "from three meters to five meters" is a continuous range. The range "integer ranges from three meters to five meters" is a discrete range.

A range includes two ends, and each such end is, where the range is inclusive, a thing that is included in the range. Thus a range inherently has antecedent basis for the term "the ends", and has antecedent basis for the term "an end" and has antecedent basis for the terms "the first end" and "the second end". Where the range is ordered or may be ordered (e.g., a range of integers that may be ordered numerically, a range of text that may be ordered alphabetically) the range includes ends that are distinguishable because of their respective ordering. Thus a range that may be ordered has antecedent basis for terms that denote the place of the end in the ordering scheme (e.g., a range that can be numerically ordered has a "low end" and a "high end").

When used to compare values (e.g., integers, fractions) which are capable of being ordered with respect to each other, the phrase "not greater than" is equivalent to "less than or equal to". Similarly, the phrase "not less than" is equivalent to "greater than or equal to".

In reference to a plurality of things (e.g., a plurality of widgets) superlatives, where a superlative may be applied to the plurality (e.g., the largest widget of the plurality of widgets, the lowest price of the set of prices) and there is inherently antecedent basis for such superlative.

For example, for a plurality of numbers, there is inherent antecedent basis for the phrase "the greatest number of the plurality of numbers", e.g., since numbers can be ordered from least to greatest and thus the greatest number is readily and unambiguously ascertainable—the greatest number is that number of the plurality of numbers which is greater than all other numbers of the plurality of numbers. Similarly, in an embodiment where there are two equal numbers, and both numbers are greater than all other numbers in the plurality, then there are two greatest numbers.

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, heuristically "best guessing", averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. Thus, the mere usage of the ordinal number "first" does not indicate that there must be a "second". For example, the use of the phrase "a first widget" does not imply that there be a second widget. Accordingly, it would not be ambiguous or indefinite to use in a claim the term "a first widget" where no "second widget" is recited in that claim (or in any other claim it depends on). The mere usage of the ordinal number "second" or greater ordinal numbers does not indicate that there must be a "first" or any lesser ordinal number. For example, the use of the phrase "a second plurality of widgets" does not imply that there be a first plurality of widgets. Accordingly, it would not be ambiguous or indefinite to use in a claim the term "a second plurality of widgets" where no "first plurality of widgets" is recited in that claim (or in any other claim it depends on). A term which is labeled by an ordinal number is different than a term that is not modified by any ordinal number. For example, in a claim a reference to "a green widget" and a reference to "a second green widget" means that there are references to different widgets and thus there is no ambiguity as to whether the second green widget is or is not a reference to the green widget. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. (Conversely, a single computer-based device may be substituted with multiple computer-based devices operating in cooperation with one another.) Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. Disclosed Examples and Terminology Are Not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. §1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed inventions are widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims recite purposes, benefits and possible uses of the claimed invention only and do not limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long periods of time (e.g. weeks at a time). In addition, devices that are in communication with each other may communicate directly or indirectly through one or more intermediaries. Devices are in communication with one another if they are capable of one-way communication with one another. For example, a first device and a second device may be in communication with one another if the first device is capable of transmitting information to the second device, and the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory (or other computer readable medium) that stores a program comprising instructions that, when executed by the processor, direct the processor to perform the process. The memory can be in communication with the processor, e.g., via a bus or network.

A computer readable medium can be in communication with a processor such that the processor can receive some or all of the instructions stored on the computer readable medium. Likewise the processor can execute some or all of the instructions stored on the computer readable medium, and can execute different instructions at different times. Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory of a computer or computing system. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks, semiconductor memory (e.g., RAM, ROM, flash drives, semiconductor hard drives). Therefore, for example, a tangible computer-readable medium is not a carrier wave or an RF transmission.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCPorIP, TDMA, CDMA, and 3G; and/or (iv) encrypted to ensure privacy or prevent fraud in any of a variety of ways well known in the art.

A "user interface" is 'used by' a device, such as a computing device, to provide outputs to a user and to receive inputs from a user. For example, the user interface may direct the device to display (or otherwise provide) certain outputs (as defined by the user interface), and allow inputs to be received from the user via the device. In an embodiment, in order for the device to generate the user interface, the device executes certain instructions, e.g., instructions to output data and receive data as inputs. A user interface can include one or more output controls which output data and/or one or more input controls which allow data to be received. A type of input control allows a selection of an option from among a plurality of options, and may allow only one option to be selected, may allow one or more options to be selected, may allow that a predetermined number of options are selected, may allow that no options are selected. An input control may define the format of type of input that may be entered. A control may function as both an input control and as an output control.

A description of different capabilities of a user interface (e.g., by describing different embodiments of a user interface, by describing different things that a user interface can do) does not mean that in all embodiments the user interface must include all such described capabilities. On the contrary, such description also supports an embodiment in which, e.g., a user interface has only one of the described capabilities, and supports an embodiment in which a user interface has a particular combination of less than all of the described capabilities.

A description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as those described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal, from the scope of the invention, of additional, different embodiments, and similarly references to the description of embodiments which all include a particular feature do not indicate a disclaimer or disavowal of embodiments which do not include that particular feature. A clear disclaimer or disavowal in the present application will explicitly refer to the scope of the invention as disclaiming or disavowing certain subject matter and will also be prefaced by a phrase such as "does not include" or "cannot perform".

IX. Incorporation By Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Conversely, the definitions and other subject matter explicitly set forth in this application should not be used to limit, define, or otherwise construe any term of any document incorporated herein by reference. Nothing explicitly set forth in this application should be interpreted as an admission or characterization of any prior art to this application.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art refers to the prosecution history of the present application, but not to the prosecution history of any other patent or patent application, regardless of whether there are other patent applications that are considered related to the present application, and regardless of whether there are other patent applications that share a claim of priority with the present application.

XI. Additional Embodiments

Some types of video games are accessible to multiple players via a server or other coordinating device. For example, hundreds of thousands of players access games known as massive multi player online games (MMOGs). Players of such games typically access the game repeatedly (e.g., for durations ranging from a few minutes to several days) over given period of time (e.g., days, weeks, months or even years). These games are often constructed such that players pay a periodic subscription price (e.g., $15 per month) rather than, or in addition to, paying an upfront purchase price for the game. Often, though not necessarily, these games have no ultimate "winner" or "winning goal," but instead attempt to create an enjoyable playing environment and a strong player community.

Unless stated to the contrary, for the purposes of the present disclosure, the following terms shall have the following definitions:

Credit Card—means a credit instrument issued (e.g., by a real-world institution) to a player, in which the credit instrument allows the player to make purchases. Typically purchases are made by providing an account identifier (e.g. a credit card number) rather than by tendering cash or other currency. An example is a credit card like those issued by Visa, Mastercard, or American Express. For the purposes of the present disclosure, the term "credit card" is used in a very broad sense and is not limited to those situations in which a player's purchases are made on credit (i.e. is not limited to where payments for purchases are due monthly or another time well after the purchase). The term "credit card" also includes payment instruments such as debit cards, check cards, and the like.

Billing Information—means any information used in or otherwise pertaining to billing a player. Billing information may include, e.g., a billing address, a credit card account, a bank account, a pay pal account or other payment information.

Player—means a person that plays a video game. In an embodiment, the video game may permit players to register an account with a Video Game Central Server or within a peer-to-peer network, and/or create or operate player characters that can interact with other player characters in a video game environment.

Player Character—means a persona in a video game that is created and/or operated by a player of the video game. Such a player may be referred to as the player corresponding to the character.

Character Account—means an account that records, maintains and/or provides access to character attributes.

Character Attribute—means any quality, trait, feature or characteristic a particular character can have. Examples of character attributes include:
A character score
A virtual object
The physical appearance of a character
An emblem or mark
A synthetic voice
Virtual money
Virtual help points or credits
The ability to join groups of other players at a later time
A score for subsequent matching of later game parameters
A relationship with another character
A genetic profile or makeup Character Life—means a period of virtual or real world time during which a player character can exist in a game environment.

Character Skills—means game attributes, whether inherent or acquired by a player character during game play, such as: the ability to cast certain spells, foretell the future, read minds, use certain weapons, cook, hunt, find herbs, assemble herbs into potions, mine, assemble objects into other objects, fly, and/or enchant other player characters.

NPC ("Non Player Character")—means a character that is operated by the video game or by other software control or that is otherwise operated without direct control by a player.

Game Parameter—means any part of a Video Game by which characters can be measured. Examples of game parameters include:
Completing all or part of a mission
Playing for a particular period of time
Winning a match, e.g., against another player character or computer-generated character
Reaching a certain level or score
Using or obtaining an ability, object or technology
kill/death ratios
solving a puzzle
accuracy with weapons
effective use of a proper weapon
killing a certain creature/character
getting through or to a certain geographic area in the virtual world
decreasing or increasing Karma Points
getting, buying, exchanging or learning a new skill or player attribute
having a child
getting married
obtaining, buying, trading, producing or developing raw materials
producing goods or services
earning income
earning a higher rank in a group (e.g., in an army, clan or guild)
winning an election among two or more player characters
achieving deity status
improving player character status or caste
assisting other player characters with any of the above
speed of accomplishing any of the above or other game parameters In-game Marketplace—means a virtual environment where characters can buy, sell, exchange or otherwise transact in attributes.

Real Cash Value—means the value in real world currency (e.g., U.S. dollars) of something, such as an obligation. This value can be determined, e.g., by multiplying the financial obligation value by the then-published exchange rate to real dollars.

Game Environment—means the world accessible via an online game such as World of Warcraft or a virtual community such as Second Life. In some games, data representing the game environment is stored on the video game central server and/or video game consoles.

Total virtual obligation amount—means the total amount of virtual financial obligations associated with a player character.

Virtual Contract—means an enforceable agreement with a player (or player character), such as between players or between a player and a game server operator. Some examples of virtual contracts are provided in U.S. Provisional Patent Application Ser. No. 60/652,036, which is hereby incorporated by reference in its entirety as part of the present description.

Player to Player Contract—means a virtual contract between players that allows players to provide or exchange game attributes to one another. In an embodiment, once a player-to-player contract is established, the game server or peer-to-peer network can automatically distributes acquired game attributes between the player characters based on the contract conditions.

Virtual—means in or pertaining to a game environment or other intangible realm.

Virtual Environment—means an online game such as World of Warcraft or a virtual community such as Second Life.

Virtual Creditor—means an entity, such as a player, owed a virtual obligation by a player or player character.

Virtual Financial Obligation—means an agreement by a player character or entity to pay one or more game attributes to another, such as to another player character or the game server operator. This obligation can be, e.g., a one time payment, or multiple payments over time. The obligation might specify, e.g., that payments are due on virtual or real dates.

Virtual Financial Obligation Value—means the in-game value of the obligation. For virtual cash the value is typically expressed as a virtual cash amount. For other game attributes, the value might be determined, e.g., by generating a virtual cash market value for the item based on the current value in an online marketplace or exchange. The value of the obligation might also be set as a condition of the player contract.

Massive Multi Player Online Video Game—means a video game that is played using either (a) a network of a video game central server and at least two video game consoles or (b) a peer-to-peer network of at least two video game consoles.

Novice Player—means a player that is identified as requiring the help of an expert to complete a game parameter.

Player Account—means an account (e.g., stored on the video console, the video game central server or across a peer-to-peer network) that describes a player profile, such as personal information, billing information, and character account information.

Player Attribute—means any attribute that can be applied to a player account. Examples of player attributes include: real money discount of monthly fees for playing the game, monthly fee for playing the game, global character attribute settings for all characters created by player across multiple games, and rewards for encouraging another player to register to play the game.

Video Game—means a game played on a video game console. One type of video game is networked to a Video Game Central Server. Another type of video game is networked within a peer-to-peer network. A video game may include many games and may include other features separate from game playing. In some video games, characters can interact with each other in a video game environment that is stored on the video game central server and the video game consoles.

Video Game Console—means a device comprising a CPU, memory and optional permanent storage, where the device resides at a player location (e.g., home, office, game playing business), and where the device allows for the playing of video games (e.g., by executing software). Examples of video game consoles include home computers, cell phones, smart phones, PDAs, Microsoft Xbox, and Sony Playstation. A video game console may or may not be networked. A video game console may be capable of performing additional functions besides allowing for the play of video games.

Video Game Central Server—means a device comprising a CPU, memory and permanent or temporary storage, where the device is connected to multiple video game consoles and where the device allows for Massive Multi Player Online Video Games to be played.

In an embodiment, a video game can provide an offer to a player of the video game. For example, the video game can provide to the player an offer to receive a particular virtual item (a virtual object or a virtual service delivered in the video game) in exchange for a particular price.

In an embodiment, the time at which the offer is provided to the player can be governed by the status in the game of the player character of the player. The status of the player character includes things such as the location of the player character in the virtual world, what has occurred in the video game around the player character or involving the player character, what is about to occur in the video game around the player character or involving the player character, what actions the player character has taken and the condition of certain NPCs that the player character has fought.

In an embodiment, it can be useful to offer to a player an opportunity to overcome an obstacle or achieve a goal, especially one that has been difficult for the player. For example, it can be useful to offer to a player an opportunity to defeat an opponent the player has been unable to defeat, or an opportunity to complete a mission which requires solving a difficult puzzle the player has been unable to solve.

According to an embodiment, the video game can provide an offer to a player of the video game at a time when the player has, for example, encountered a difficulty, perhaps repeatedly encountered a difficulty. The offer can be, for example, for an item that is useful in overcoming the difficulty the player has encountered.

For example, in an embodiment when the player has failed to kill a particular monster after three attempts, the video game can provide an offer to the player. The offer can be, for example, for a powerful weapon that would be useful in killing the monster.

The status in the game of the player character can govern (a) the time at which the offer is provided to the player corresponding to the player character, and/or (b) the virtual item that is offered to the player corresponding to the player character. In an embodiment, players or other entities can select or otherwise establish particular virtual items to be offered and what kinds of status of players trigger the providing of offers to players. In this manner, an entity (e.g., a player) can determine what is offered to one or more players and under what circumstances such an offer is made to one or more players, and the entity may also determine, e.g., a price the player must pay for the item. In an embodiment, the designer of the video game or another entity that is affiliated with the commercialization or management of the game can establish particular virtual items to be offered and what kinds of status of players trigger the providing of offers to players. For example, the video game may be built with a set of predetermined items to offer to one or more players under predetermined circumstances. As another example, the operator of a server that runs the video game may determine what is offered to one or more players and under what circumstances such an offer is made to one or more players.

ONE EXAMPLE

A first player establishes a condition that is the failure to complete a particular level in the game after three attempts and the player also establishes an upsell message. A database entry stores this condition and this upsell message. When a player character satisfies the condition by failing to complete the particular level in the game after attempting to do so three times, the server that manages the video game detects this fact (e.g., by comparing the status of the player character with entries including the entry storing the condition that is the failure to complete a particular level in the game after three attempts), and outputs the upsell message to the player corresponding to the player character. For example, the upsell message can be displayed in a window in the game. The window can display the text such as "Would you like to complete this level?", as well as a button or other control to permit the player to indicate whether he accepts the upsell offer.

If the player corresponding to the player character clicks the button to indicate acceptance, a message is output (e.g., via the window) indicating the price he can pay to complete the level. For example, the price can be, e.g., in game currency (e.g., pay 100 gold coins), virtual items (e.g., forfeit a sword or health points, perform a service with the player character), in real currency (e.g., pay $2). If the player corresponding to the player character accepts, then payment is made from him to the first player, and the first player in exchange grants or lends the second player an item (e.g., a very powerful weapon) that permits the second player to complete the particular level.

ANOTHER EXAMPLE

The game designers or another entity that is affiliated with the commercialization or management of the game can establish (a) a condition that comprises the failure to complete a particular level in the game, and (b) an upsell message. For example, such a condition could be built into the video game software and available when the software is deployed. When a player character satisfies the conditions by failing to complete the particular level in the game, the upsell message is output to the player. For example, the upsell message can be displayed in a window in the game. The window can display the text such as "would you like to complete this level?", as well as a button or other control to permit the player to indicate whether the upsell offer is accepted.

If the player clicks the button to indicate acceptance, a message is output to the player indicating the price he can pay to complete the level. For example, the price the second player can pay can be, e.g., in game currency (e.g., 100 gold coins), virtual items (e.g., forfeit a sword or health points), in real currency (e.g., $2). Payment is made from the player (e.g., to the game company or another entity affiliated with the commercialization of the game), and the game software moves the player to the next level or grants or lends the player an item that permits the player to complete the particular level.

In an embodiment, a video game system can include a module or device that provides offers to players. Such a module or device can be, for example, a server (or a component thereof) that coordinates play of the video game by a set of distributed video game devices (e.g., personal computers of different players, cellular telephones of different players). Such a device may be a separate device that communicates with such a server and/or with video game devices.

In an embodiment, a video game system can include a module or device that receives and records data defining such offers (as well as other data about the offer) from one or more sources of such data. As used herein, data about an offer includes not only data defining some or all of the offer to provide (e.g., text such as "would you like some help?"), but also includes data that specifies, e.g., when to provide the offer.

For example, the video game system can include a module or device that communicates with a plurality of players and permits each of those players to enter data about an offer. As another example, the video game system can include a module or device that communicates with a plurality of entities that are not necessarily players. For example, such data may be entered via a user interface (e.g., an HTML form in a web browser, a custom application) and such data may specify, e.g., a respective upsell offer (e.g., a textual message such as "Would you like advice on finishing this level?", an image graphically conveying the offer, a video or audio that conveys the offer), a respective status of a player character in the video game (e.g., that the player has less than five health points, that the player has tried and failed to complete level five more than three times), a respective in-game item (e.g., a weapon, advice, training, health points, money), a respective price to pay for the item (e.g., twenty gold coins, one real-world dollar, perform a service), for how long the offer may be accepted (e.g., indefinitely, within the next twenty seconds, until another player accepts the same offer or a similar offer, until the status of the player character becomes a specified status) and/or a respective second player to pay for the item.

Such data may be created and/or managed by any of a number of different types of entities. For example, one such entity can be a provider of in-game services or an advertiser for a third party provider of in-game services. In an embodiment, a player or another entity may be a willing to provide training services, such as services generally related to how to play the video game or parts of the video game, or how to play the video game or parts of the video game better. In an embodiment, a player or another entity may be a willing to transact in virtual objects. Such an entity could sell, lease or lend virtual objects in the video game, and such an entity may be able to partially or completely consummate such transactions within the video game itself (e.g., by receiving payment via the video game for a virtual object that is sold). In an embodiment, a player or another entity may be a willing to provide loans or other financial services to other players. For example, such an entity could lend virtual currency, receive repayments and interest payments, repossess virtual objects, and assess the collateral or net worth of a player character.

Another entity that can create and/or manage such data (e.g., data about offers) includes a provider of real-world services or an advertiser for a third party provider of real-world services. In an embodiment, a player or another entity may acquire customers for real-world services (e.g., cellular telephone plans, DVD rental subscriptions) via the video game.

Another entity that can create and/or manage such data (e.g., data about offers) includes friends of certain players. For example, a first player could specify offers that are to be provided only or primarily to 'friends' of the first player. Such 'friends' might be an enumerated list specified by name or other designation, or could be all members of a friends list in a social network.

In an embodiment, a central server or other device can be operable to run a video game. For example, the device may be operable to run a video game because the device includes or receives software which, when executed by the device, allows the device to run the video game. In an embodiment, a central server or other device is operable to run a massive multi player online game, and the game is operable to simultaneously support a plurality of players via a plurality of video game devices (e.g., video game consoles). In an embodiment, each of the players controls one or more player characters. In an embodiment, the players are able to interact with each other in the video game, e.g., via avatars, via another representation of a player character.

FIG. 1 depicts a network according to an embodiment. In FIG. 1 a wide-area network permits a server to communicate with a plurality of video game consoles such as computers and a cell phone. In the depicted embodiment, the video game consoles store data representing one or more player characters (e.g., all player characters of the respective player that operates the video game console). In the depicted embodiment, the server and a video console each store data and/or software modules ("MBU") for managing offers which can be provided to players. The server also has access to additional data, such as via connected or remote databases. Such data may include, e.g., data for use in generating or executing one or more video games.

Figure 2:
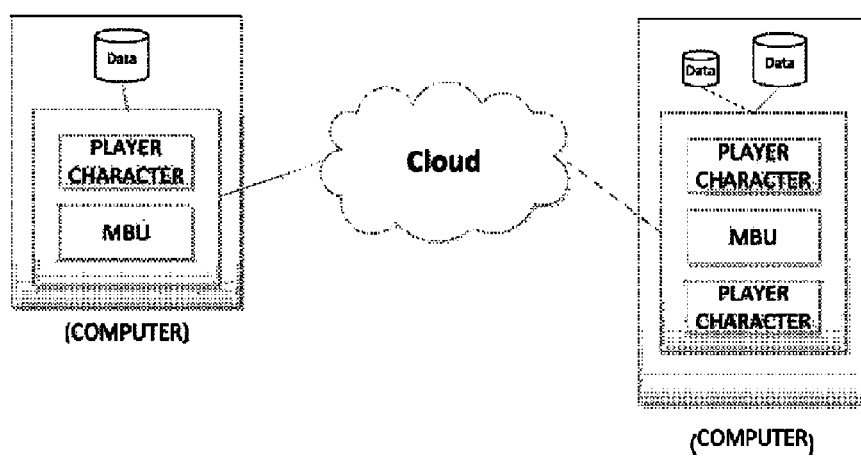
FIG. 2 depicts another network according to an embodiment.

FIG. 2 depicts another network according to an embodiment. In FIG. 2 a two video game consoles are connected via a network (Cloud). In the depicted embodiment, both video game consoles store data representing player characters (e.g., all player characters of the respective player that operates the video game console). In the depicted embodiment, both video consoles store data and/or software modules ("MBU") for managing offers which can be provided to players. The video game consoles also have access to additional data, such as via connected or remote databases. Such data may include, e.g., data for use in generating or executing one or more video games.

Figure 3:
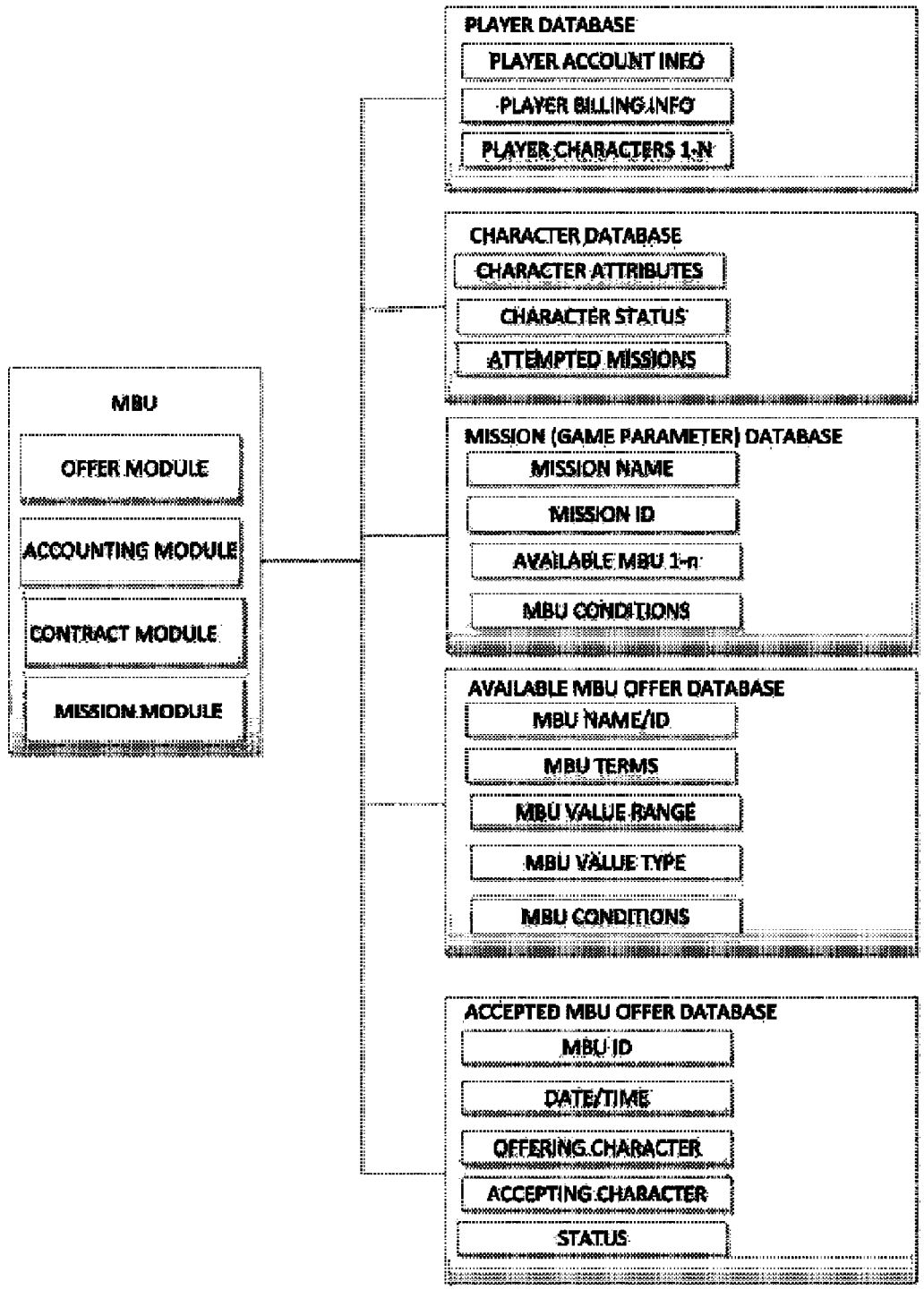
FIG. 3 depicts a system used in providing offers according to an embodiment.

FIG. 3 depicts a system used in providing offers according to an embodiment. A module ("MBU") includes data and/or software modules for managing offers which can be provided to players. An offer module manages the offers and providing of offers. An accounting module manages payments involved with offers. A contract module manages player contracts and other obligations that are involved with offers. A mission module manages aspects of missions that involve offers (e.g., completion of missions). A player database includes, for each of a plurality of players, data such as player account information, player billing information and data defining player characters controlled by the player. A character database includes, for each of a plurality of player characters, character attributes, character status and missions attempted by the character. A game parameter database includes, for each of a plurality of missions, a name, identifier, whether offers are available with respect to the mission, and conditions accompanying such offers. An available offer database includes, for each of a plurality of offers, a name and/or identifier, terms, range of values, value type and conditions. An accepted offer database includes, for each of a plurality of accepted offers, an identifier of the offer, a date and time the offer was accepted, the character or entity providing the offer, the character or player accepting the offer, and the status of the offer (e.g., whether all obligations of the parties have been satisfied).

Figure 4:
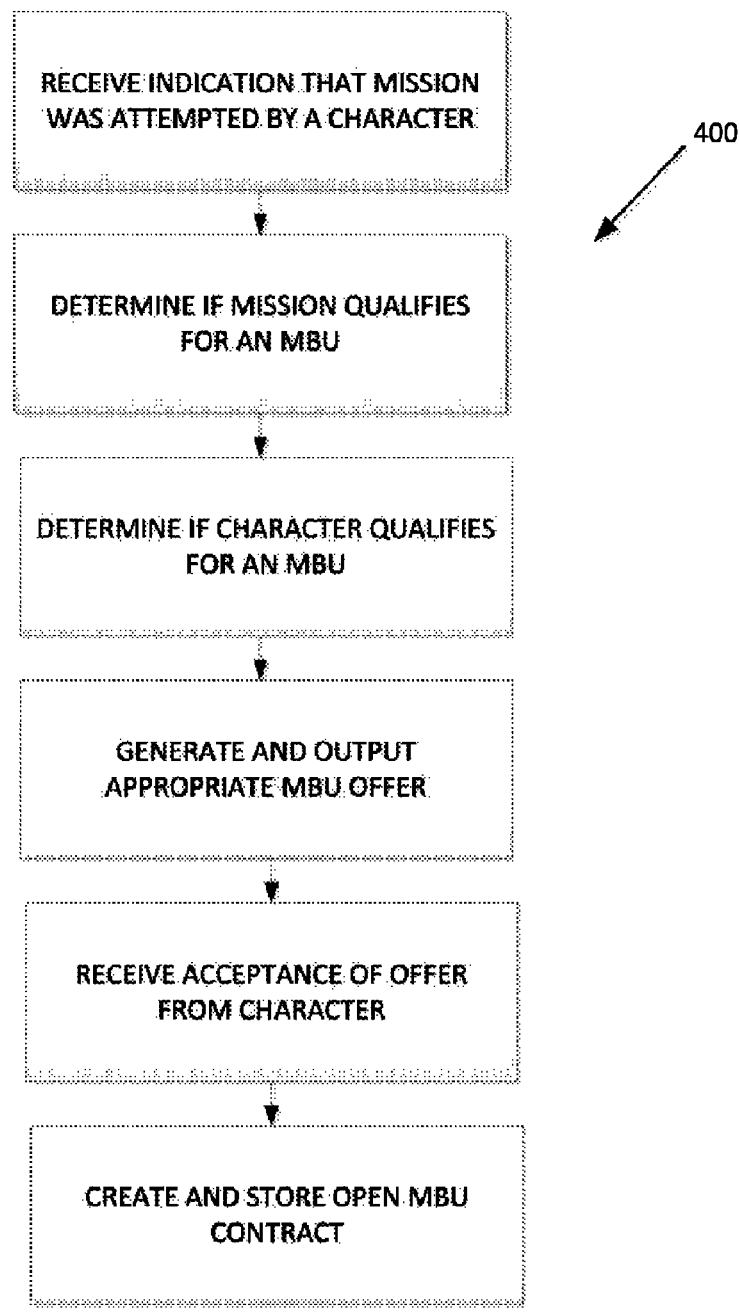
FIG. 4 depicts a process according to an embodiment.

FIG. 4 depicts a process 400 according to an embodiment. The process 400 may be used, e.g., in providing an offer to a player that attempted to complete a mission.

Figure 5:
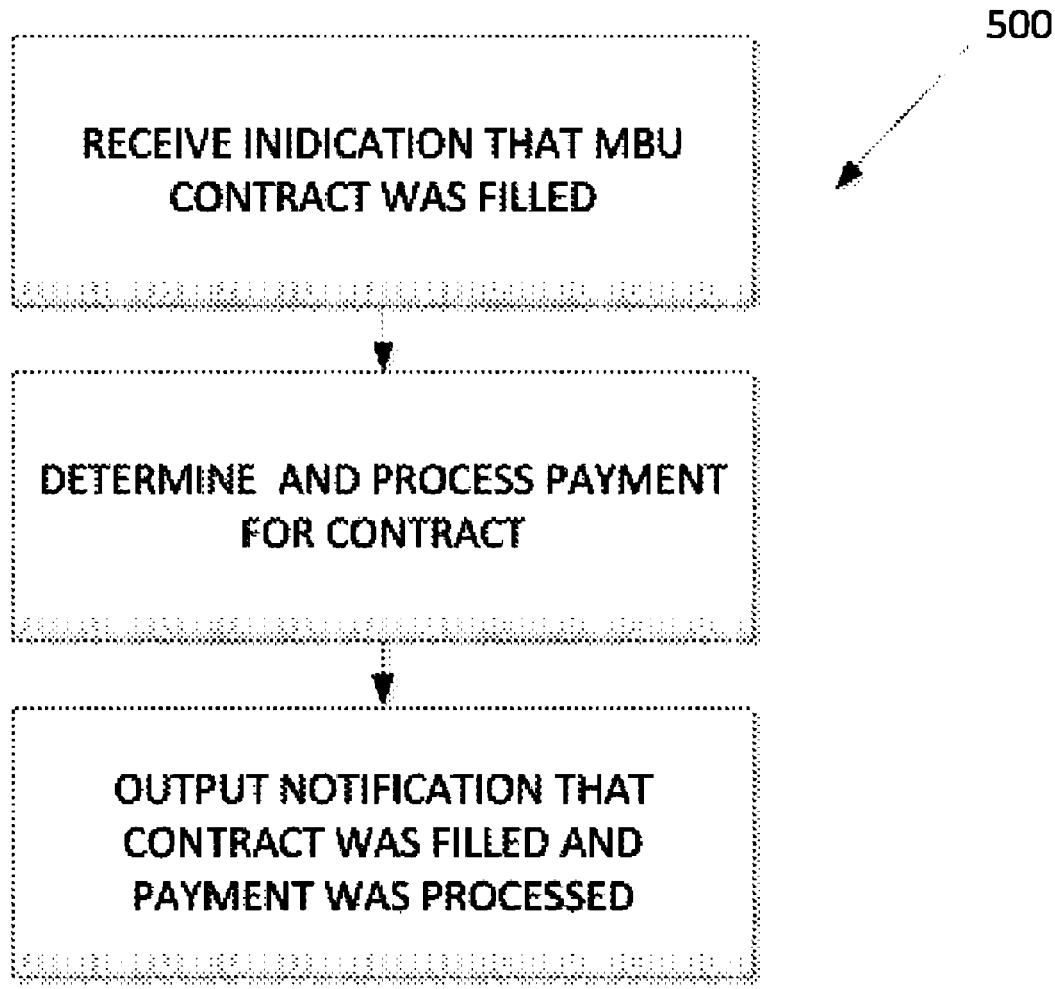
FIG. 5 depicts a process according to an embodiment.

FIG. 5 depicts a process 500 according to an embodiment. The process 500 may be used, e.g., in closing out a contract created by accepting an offer.

The video game can provide an offer to a player at a time that is governed by the status in the game of the player character of the player.

According to an embodiment, the system that runs the video game, or a component of such a system, determines the status in the game of the player character. For example, in an embodiment where a server or other device coordinates play of the video game by a set of distributed video game devices, the server can determine the status of the player character. As another example, a video game device executing software that runs the video game, or that runs a portion of the video game, can determine the status of the player character.

In an embodiment, a device that determines the status of the player character can communicate some or all of that status to another device. For example, a video game device can determine some types of the status of the player character and communicate that to a server that coordinates play of the video game. In an embodiment, the status in the game of a player character may be determined by two or more cooperating devices.

Various types of status of a player character are commonly recorded and/or manipulated by the devices that run or manage the video game. For example, the location of the player character in a virtual world is typically managed by the system that runs the video game (e.g., by a server that coordinates play of an online multi-player game).

In an embodiment, determining that a player character in a video game has a particular status comprises determining that the player character is at the start of a mission or is about to begin a performing a task or objective.

In an embodiment, determining that a player character in a video game has a particular status comprises determining that the player character has failed to complete a mission or task, or failed to achieve an objective. One type of objective is to transition to a subsequent level in the video game. The term level may refer to the ability or other characteristics of a player character. For example, in some video games a player character has a level which generally corresponds to the experience or power of the player character. The term level can also refer to a location in the virtual world. A level may have a different appearance than other levels in the video game. For example, many video games have levels which the player character must complete, and immediately after completing a level (e.g., level four) the player begins at the next level (e.g., level five). In some video games, a player may only go from one (location) level to the next level and cannot otherwise change levels (e.g., move back to a previously played level).

Another type of objective is to kill a particular monster, NPC or player character. Another type of objective is to locate a particular virtual object (e.g., a particular building, a particular weapon). Another type of objective is to locate or interact with a particular player character or NPC. Another type of objective is to position the player character at a particular location in the virtual world, or otherwise have the player character access a particular location in the virtual world.

In an embodiment, determining that a player character in a video game has a particular status comprises determining that the player character has particular attributes, such as a particular number of health points, a particular number of gold pieces or other monetary denomination, a particular score, a particular level of strength, dexterity, constitution or other player character skill, or a particular number of connections in a social network (e.g., a number of friends in a friends list). Determining that the player character has particular attributes includes that the player character has more than a threshold number of something (e.g., a score of more than 25,000), less than a threshold number of something (e.g., less than ten health points), exactly a particular number of something (e.g., has exactly one life remaining), has something within a range (e.g., has a strength score between three and six), or any other manner of matching the attributes of a player character to particular attributes.

In an embodiment, determining that a player character in a video game has a particular status comprises determining that the player character has a particular virtual object or particular type of virtual object. For example, the particular status may be that the player character has at least one weapon.

In an embodiment, determining that a player character in a video game has a particular status comprises determining that the player character did not have, but has acquired, a particular virtual object or particular type of virtual object. For example, the particular status may be that the player character has acquired armor.

In an embodiment, determining that a player character in a video game has a particular status comprises determining that the player character does not have a particular virtual object or particular type of virtual object. For example, the particular status may be that the player character does not have any food.

In an embodiment, determining that a player character in a video game has a particular status comprises determining that the player character had but no longer has a particular virtual object or particular type of virtual object. For example, the particular status may be that the player character lost a car.

In an embodiment, determining that a player character in a video game has a particular status comprises determining that the player character is in danger of dying. In an embodiment, determining that a player character in a video game has a particular status comprises determining that the player character is about to make a strategic or tactical mistake or misstep.

In an embodiment, determining that a player character in a video game has a particular status comprises determining that the player character has failed more than a predetermined number of times to complete a mission or task or to achieve an objective.

In an embodiment, determining that a player character in a video game has a particular status comprises determining that the player character has been partially but not completely successful in completing a mission or task or in achieving an objective.

In an embodiment, determining that a player character in a video game has a particular status comprises determining that the player character has discovered some but not all virtual objects which are capable of being discovered.

In an embodiment, determining that a player character in a video game has a particular status comprises determining that the player character has accomplished a mission or task, but is in an undesirable state after doing so. For example, the player character may have defeated a monster but has received significant damage in doing so.

In an embodiment, determining that a player character in a video game has a particular status comprises determining that the player character has accomplished a mission or task, but has taken too long (e.g., more than a threshold amount of time, more than a threshold number of attempts) to do so.

In an embodiment, determining that a player character in a video game has a particular status comprises determining that the player character is at a particular location in the virtual world.

In an embodiment, determining that a player character in a video game has a particular status comprises determining that the player character is within a predetermined distance in the virtual world from another player character, from a NPC or from any thing with a variable location in the virtual world.

In an embodiment, determining the status of a player character comprises determining one or more types of status (and possibly not determining other types of status).

In an embodiment, determining that a player character in a video game has a particular status comprises determining a previous status of the player character. For example, determining a previous status can include determining whether the player character has ever possessed an object, or has ever encountered a particular monster.

In an embodiment, determining that a player character in a video game has a particular status comprises a combination of any of the determinations described herein. For example, determining that a player character in a video game has a particular status can comprise determining that the player character both (a) has less than fifty health points, and (b) has twice failed to defeat a particular NPC opponent.

Many video games currently store and manipulate some types of status of player characters, such as in one or more variables which are stored in software and accessible by the video game. Many video games currently record such status as the player character having killed a certain NPC or player character, or having transitioned to a subsequent level in the video game.

The video game can provide an offer to a player at a time that is governed by the status of the player. In an embodiment, determining that a player character in a video game has a particular status comprises determining the location of the player (e.g., determining the address of the video game console the player uses via its IP address, determining the location of the player's phone which has a GPS transceiver, determining the location of the player by content made available such as a self-described location posted on a web site such as Facebook, Twitter or LinkedIn). In an embodiment, determining that a player character in a video game has a particular status comprises determining that the location of the player meets particular criteria (e.g., the player is in the state of California, the player is on a particular street, the player is within a threshold distance of another player or person, the player is near a store of a chain of stores).

In an embodiment, the offer can be provided immediately after determining the status that triggers the offer. For example, where an offer is to be provided to a player when their player character has less than ten health points, the offer could be provided immediately after the health points of the player character decrease below ten.

In an embodiment, the offer can be provided some time after the time that the status of the player character attains the status that triggers the offer, such as a predetermined amount of time after such time the status is attained, when a randomly-determined amount of time has passed after such time the status is attained, or at a random time after such time the status is attained.

In an embodiment, the offer can be provided some time after determining the status that triggers the offer, such as a predetermined amount of time after such determining, when a randomly-determined amount of time has passed after such determining, or at a random time after such determining.

In an embodiment, a plurality of offers (for virtual items which are not necessarily related) can be provided as a single offer is provided. For example, upon determining that the status of a player character is a particular kind of status, a plurality of offers may be provided to the player. A plurality of offers may be all accepted, may be all rejected, or some portion of the plurality of offers may be accepted.

In an embodiment, a player may request that he be provided with an offer. For example, the player may encounter a difficult part of a mission and desire to receive some assistance. In an embodiment, a player requesting an offer is provided with an offer. In an embodiment, a player may request that he be provided with an offer meeting particular criteria (e.g., price, virtual item or type of virtual item, that the virtual item be useful in completing a particular mission or in achieving a particular objective). In an embodiment, a player may request that he be provided with an offer meeting particular criteria (e.g., price, virtual item or type of virtual item). In an embodiment, a player requesting an offer is only provided with an offer if, e.g., he qualifies to receive an offer, he has not previously accepted a threshold number of offers, offers are otherwise available to him.

A method involved in selecting offers to provide players according to an embodiment includes the following steps:
1. Retrieve activities of a player character
2. Generate and store a profile of an offer for the player character based on account activity
3. Retrieve profiles of offers
4. Determine appropriate profiles that qualify for an offer
5. Output offer to the player corresponding to the profile A method involved in specifying offers to provide players according to an embodiment includes the following steps:
1. Receive a request to enter an offer from an offer provider
2. Output an offer form
3. Receive terms and conditions via the form
4. Determine if the offer provider qualifies to sell virtual items
5. Store the offer specified by the received terms and conditions A method involved in providing an offer according to an embodiment includes the following steps:
1. Receive an indication that a player character is about to attempt a mission
2. Determine if offers are available for the player
3. Determine if the player character qualifies for an offer
4. Output offer to player
5. Receive acceptance of offer
6. Flag account of player character with mission complete status based on conditions of the offer A method involved in providing an offer according to an embodiment includes the following steps:
1. Receive an indication that a player character failed the completion of a mission
2. Determine if offers are is available
3. Determine if the player character qualifies for an offer
4. Output offer
5. Receive acceptance of offer
6. Flag player character account with mission complete status based on conditions of the offer A method involved in providing an offer according to an embodiment includes the following steps:
1. Receive indication that a player character has completed all or part of a mission
2. Determine that the mission was completed in an unsatisfactory way
3. Determine if offers are available
4. Determine if player character qualifies for an offer
5. Output offer
6. Receive acceptance of offer
7. Flag player character account with mission complete status based on conditions of the offer A method involved in providing an offer according to an embodiment includes the following steps:
1. Generate a list of missions that a player character can complete
2. Determine if offers are available
3. Determine if the player character qualifies for an offer
4. Output offer
5. Receive acceptance of offer
6. Flag player character account with mission complete status based on conditions of the offer A method involved in providing an offer according to an embodiment includes the following steps:
1. Determine that a first player character is within the physical vicinity of a second player character
2. Generate a list of missions available for the first player character
3. Determine if any offers are available
4. Determine if the first player character qualifies for an offer
5. Output offer
6. Receive acceptance of offer
7. Flag first player character account with mission complete status based on conditions of the offer A method involved in providing an offer according to an embodiment includes the following steps:
1. Determine that a player has obtained a threshold number of connections on a social network
2. Generate list of missions available for the player's player character
3. Determine if any offers are available
4. Determine if the player character qualifies for an offer
5. Output offer
6. Receive acceptance of offer
7. Flag player character account with mission complete status based on conditions of the offer The virtual item that is offered can be a temporary or permanent change in the video game. For example, the virtual item that is offered can be that the difficulty of the video game or the difficulty of portions of the video game can be reduced. As another example, the virtual item that is offered can be that a mission or task will automatically be deemed completed, or that an objective will automatically be deemed achieved.

The virtual item that is offered can be directly related to the status that triggers the providing of the offer. For example, an offer can be triggered by the player character failing to complete a mission or task, and the virtual item that is offered can be that the mission or task will automatically be deemed completed. As another example, an offer can be triggered by the player character failing to complete a mission or task, and the virtual item that is offered can be that the mission or task will easier to complete (e.g., because the difficulty of the mission or task will be reduced, because the player character will be granted extra power or a virtual object to facilitate the completion of the mission or task).

The virtual item that is offered can be a virtual object, such as a score, weapon, armor, equipment, food, health points, strength points, skills, money, points of any kind, or anything that the player character could attain in the video game.

The virtual item that is offered can be a virtual service that is delivered in the video game. Note that some types of virtual items that are offered may reasonably be considered to be both a virtual object and a virtual service. In an embodiment, a virtual service is provided by another player, or by any other entity such as a merchant via the merchant's computer in the real world that communicates via the video game with the player. A virtual service may be provided by no live entity, such as by an NPC, by the video game system alone or by another device alone.

In an embodiment, the virtual item that is offered is to have another player character complete a mission or task or achieve an objective for the player. For example, an offer can be triggered by the player character failing to complete a mission or task, and the virtual item that is offered can be that another player character will complete the mission or task.

In an embodiment, the virtual item that is offered is to have another player or player character provide, to the player, training in completing a mission or task or in achieving an objective. For example, an offer can be triggered by a first player character failing to complete a mission or task, and the virtual item that is offered can be that another player or player character will train the player corresponding to the first player character in how to complete the mission or task. Such training can include, for example, providing a guide, providing a file, providing a video, providing an audio message, and/or opening a communication channel (e.g., instant messaging, two-way voice over IP communication) between the players.

In an embodiment, the virtual item that is offered is to have another player assume control of the player character and complete a mission or task or achieve an objective with the player character. For example, an offer can be triggered by a first player character failing to complete a mission or task, and the virtual item that is offered can be that another player assumes control of the first player character and completes a mission or task with the player character. In an embodiment, the other player assumes control of a player character until the occurrence of an event (e.g., until the completion of the mission or task), after which control of the player character is returned (e.g., immediately) to the original player. In an embodiment, the other player assumes control of a player character until the original player character indicates that control of the player character should return, after which control of the player character is returned (e.g., immediately) to the original player.

In an embodiment, the virtual item that is offered is to provide information available to the video game but not typically revealed to the player, such as the health or other attributes of other player characters or players.

In an embodiment, the virtual item that is offered is to show the location of another player or player character, such as on a map shown in a portion of a display device of the video game console (e.g., on a screen of a cell phone). Such an offer can be triggered by the respective locations of a first player and a second player (e.g., a first player being within a predetermined distance of a second player, the first player and second player being within the same town).

In an embodiment, the virtual item that is offered is to provide a map or description of directions from the location of the player to another location, such as to a real-world store or to the location of another player. Such an offer can be triggered by the respective locations of a first player and a second player.

In an embodiment, the virtual item that is offered is to send a message or command to a real-world device, such as to a cell phone, smart phone or PDA (e.g., make a particular person's cellphone ring, make an application executing on a smart phone play an audio tone). Such an offer can be triggered by the respective locations of a first player and a second player.

In an embodiment, the virtual item that is offered is to have another player, person or other real-world entity perform a service (e.g., send a message directing another player to perform a service for the player). Such an offer can be triggered by the respective locations of a first player and a second player.

In an embodiment, the virtual item that is offered is to have a player character perform a service in the virtual world. Such an offer can be triggered by the respective locations of a first player and a second player.

In an embodiment, a plurality of virtual items are offered and the player can select one of the plurality to receive. For example, the player can be offered one hundred health points, a weapon and a map, and the player can select, e.g., the weapon, thereby accepting the offer of the weapon.

In an embodiment, a plurality of virtual items are offered and the player can select a predetermined number of the plurality to receive. For example, the player can be offered one hundred health points, a weapon and a map, and the player is permitted to select two of those. The player can select, e.g., the weapon and the map, thereby accepting the offer of the weapon and the map.

In an embodiment, a plurality of virtual items are offered and the player can select up to a predetermined number of the plurality to receive. For example, the player can be offered one hundred health points, a weapon and a map, and the player is permitted to select one, two or three of those.

The price to pay for the virtual item can depend on which virtual items the player selects. For example, each of the offered virtual items can have a respective price, and the price the player must pay for the selected virtual items is the aggregate of the respective prices of the selected items.

The virtual item that is offered can be one or more or any virtual item described herein or of any combination of any of the virtual items described herein. For example, the virtual item that is offered to a player can be the following: a weapon, ten health points, advice from another player on how to defeat an opponent and assistance from the other player in defeating the opponent.

The virtual item may be provided temporarily or permanently. For example, the player character may be granted a weapon, or the player character may be lent a weapon for a period of time (e.g., until defeating a particular opponent) after which the player character relinquishes the weapon.

In an embodiment, an entity (e.g., a player) may need to qualify in order to provide services that are offered to players. In an embodiment, players that qualify to provide the service can be notified (e.g., via email, via text message) by the video game that they are qualified.

In an embodiment, a service to be provided to a player can be performed by an entity that is selected from among a plurality of entities which can provide the service. For example, the entities may bid (e.g., in an open auction format) for the opportunity to provide the service, and the entity that submits the highest bid pays that bid and is selected to provide the service. As another example, the entities may bid (e.g., in an open auction format) for the opportunity to provide the service, and the entity that submits the lowest bid is selected to provide the service (e.g., to players who accept an offer) at the specified bid price.

A method involved in providing an offer according to an embodiment includes the following steps:

1. Receive request to use an offered virtual item to complete a mission
2. Perform one of the following, based on a selected offer
    2.1. Alter mission based on the offer
    2.2. Alter player character based on the offer
    2.3. Alter second player character to help first player character based on the offer 2.4. Output instructions to player character based on the offer 2.5. Transfer virtual object to/from player character based on the offer 3. Receive indication that mission has been completed by or for player character 4. Store mission completion in player character profile A method involved in providing an offer according to an embodiment includes the following steps:

1. Receive a request to receive an offer, including criteria for the offer

2. Determine a set of providers who can provide an offer meeting the criteria

3. Output a request to the set of providers

4. Receive an offer, including a price, terms and conditions, from a provider

5. Output the received offer to the player requesting the offer

6. Receive acceptance of the offer

7. Allow the provider to complete the transaction as specified by the offer

The offer can be provided to a player in any of various manners. In an embodiment, the offer can be provided by displaying the offer during play of the video game, such as in a predefined part of the screen, or in what is or appears to be a separate window. The offer can be played, e.g., an audio file or video file can be played.

In an embodiment, the offer is not displayed, played or otherwise provided to the player until the player so indicates. For example, when an offer is available to be provided, the player can be alerted, e.g., by a small icon being displayed in a portion of the screen, or a tone or other audio being played. The player can then, if desired, command the available offer(s) to be provided, e.g., by pressing a key on the keyboard or using the mouse to click a particular button or other control.

In an embodiment, offer is provided via an in-game email system or messaging system.

In an embodiment, when an offer is provided or is available to be provided, the normal play of the video game may change for the player. For example, play can slow down or stop when an offer is provided or is available to be provided, and the motion of NPCs can slow or stop accordingly. In an embodiment, the slowing or stopping may continue until the offer is either rejected or accepted. In an embodiment, the slowing or stopping may continue for a predetermined amount of time (e.g., ten seconds), after which play may resume normally, or may speed up but nevertheless be slower than normal play.

In an embodiment, the player can accept an offer by pressing a key on the keyboard, clicking a button with a mouse, traveling the player character to a particular location, or by taking any other action within the video game. In an embodiment, the player can accept the offer by sending a message (e.g., an in-game text message) or opening a communications channel (e.g., a voice chat session).

The data about the offer may specify how the offer can be or must be accepted. Different offers or different kinds of offers may have different default manners in which the offer is accepted by the player.

In an embodiment, a player can establish that certain offers, certain kinds of offers or all offers are to be accepted without further action. In an embodiment, the player can specify that all offers during a time period (e.g., the next five minutes) from a particular entity (e.g., from the video game designer, from a particular player) are to be accepted. In an embodiment, the player can specify that during a time period (e.g., until defeating a particular monster, until the player character dies) all offers of a particular type (e.g., offers related to defeating a monster) are to be automatically accepted.

In an embodiment, in which a price is charged for a virtual item that is offered, the price may be paid by the player. In an embodiment, some or all of the price may be paid for by another entity instead of the player. For example, a third party can pay for the player, and in return the player may, e.g., view an advertisement or purchase a product from the third party.

In an embodiment, the price may be paid in the form of virtual currency (e.g., gold pieces, in-game currency). In an embodiment, the price may be paid in the form of real currency (e.g., US$1.00). In an embodiment, the price may be paid in the form of virtual objects (e.g., a weapon, a virtual building).

In an embodiment, the price may be paid in the form of the player performing or agreeing to perform an action in the real world, or the player undertaking or agreeing to undertake an obligation in the real world. For example, the price may be that the player agree to visit a store in the real world such as a clothing store, make a purchase in the real world from an online merchant such as Amazon.com, In an embodiment, the price can be that the player signs up for a real-world service, such as a DVD rental service or a cellular telephone plan. In an embodiment, the player can sign up for the real-world service using the video game, perhaps without needing to perform any additional actions outside of the video game. For example, the video game can allow the player to enter various information that may be useful in providing the service (e.g., the player's name, address and credit card information), and the video game can present the player with a contract or agreement which the player can read and agree to, e.g., by clicking an accept button with a mouse or by entering his initials with a keyboard. In an embodiment, some or all of the information that may be useful or required in providing a service may be accessible by the video game. For example, the video game may have access to the billing address and credit card number of the player, perhaps because that information was provided, e.g., to pay for a subscription to the video game. In such an embodiment, the player may not need to enter such information since the video game has access to and can release that information, perhaps once receiving permission from the player.

Contracts and agreements with a player of a video game and between players of a video game are described in the following patents and application, each of which is incorporated by reference herein as part of the present disclosure:

U.S. patent application Ser. No. 11/355,232, entitled "Online Game Environment that Facilitates Binding Contracts Between Player Characters", filed Feb. 14, 2006;

U.S. patent application Ser. No. 11/279,991, entitled "Securing Virtual Contracts with Credit", filed Apr. 17, 2006, now U.S. Pat. No. 7,677,973;

U.S. patent application Ser. No. 11/611,050, entitled "Online Game Environment that Facilitates Sponsorship Contracts", filed Dec. 14, 2006;

U.S. patent application Ser. No. 11/624,662, entitled "Securing Contracts in a Virtual World", filed Jan. 18, 2007, now U.S. Pat. No. 7,666,095;

U.S. patent application Ser. No. 12/710,641, entitled "AGREEMENTS IN VIDEO GAMES PERMITTING VIRTUAL AND REAL WORLD PENALTIES OBLIGATIONS AND REMEDIES", filed Feb. 23, 2010;

U.S. patent application Ser. No. 12/725,271, entitled "MANAGEMENT ENGINE FOR CONTRACTUAL TERMS IN A VIDEO GAME", filed Mar. 16, 2010; and U.S. patent application Ser. No. 12/725,268, entitled "Apparatus and Process for Facilitating Binding Agreements Among Players of a Video Game", filed Mar. 16, 2010.

In an embodiment, a module (e.g., accessible in the video game) permits a player to specify the "completion" of a task that defines an obligation under a contract. For example, the module can provide a graphical user interface (or other interface) that lets the obligation be defined, and thus lets a player define some or all terms of a contract. For example, the user interface can allow a player to select the obligation type (e.g., "deliver an in-game item"), select what in-game item must be delivered, and select to who (e.g., to which character) it must be delivered.

Obligations can also have meta-characteristics. For example, the user interface can permit a player to select whether there is a deadline for the obligation (e.g., click the DEADLINE radio button in the user interface), and select the deadline type. For example, deadline types may include "Specific Date" (which provides the player with a calendar from which the player selects the date), "Within the next X hours of game play" (which provides a box where the player can enter a number of days/hours/minutes/seconds), "Before the occurrence of another in-game event" (which provides a user interface allowing the player to select an in-game event type), "within the next X days of the occurrence of another in-game event" (which provides a user interface allowing the player to select an in-game event type and a number of days/hours/minutes/seconds).

A similar user interface can be used to permit players to modify obligations (e.g., in a counter offer to a proposal for contract). A similar user interface can be used to permit players to modify obligations (e.g., in a counter offer to a proposal for contract). A similar user interface can be used to permit players to enter other obligations.

In an embodiment, the price may be paid in the form of the player performing or agreeing to perform an action in the virtual world, or the player undertaking or agreeing to undertake an obligation in the virtual world. In an embodiment, the price may be that the player agree to have certain advertising presented to the player in the video game. In an embodiment, such advertising could be provided to the player in the same manner that advertising is provided to other players, but the player accepting the offer could receive advertising different from the advertising provided to other players. For example, in an embodiment, advertisements are presented on a certain in-game building or an in-game sign that a plurality of players can see, e.g., when their respective player characters are in the vicinity of the in-game building or in-game sign. However, the particular advertisements that are presented on the in-game building or in-game sign can be the same for all players except those players who have agreed to receive advertising, in which case those players would receive advertising from, e.g., a merchant that provided the offer to the player.

In an embodiment, the price may be that the player agree to have certain virtual objects presented to him in the virtual world or placed in the virtual world (e.g., near the player character). For example, the price may be that all or some of the virtual cars displayed in the virtual world (or displayed in some portion of the virtual world) are Honda cars. As another example, the price may be that all or some of the music played in the virtual world (or played in some portion of the virtual world) is a certain song, is by a particular artists or is produced by a particular record label. In an embodiment, the virtual object may be seen or perceived by other players (i.e. it exists for the other players as well) but is different for the other players (e.g., has a different 'skin' as rendered by one player's video game system compared to the appearance as rendered by other players' video game system). For example, all cars in the virtual world could be seen by all players, e.g., whose respective player characters are in the vicinity of the car in the virtual world. However, the car could be displayed as a Honda car to the player who accepted an offer, but all other players would see the car differently (e.g., as being model other than a Honda car).

In an embodiment, the price may be that the player agree to have his player character have a particular appearance or have other particular characteristics. For example, the price may be that the player agrees to have his player character wear a shirt or hat that bears the logo of a sponsoring company, or otherwise having a predetermined appearance dictated by another entity (e.g., an advertiser). In an embodiment, the price may be that the player agree to have some other virtual object have a particular appearance or have other particular characteristics. For example, the price may be that the player agrees to erect a virtual building that displays a particular logo, advertisement or message.

In an embodiment, the change in appearance or other characteristics may be performed automatically (e.g., upon acceptance by the player, at a time in the future agreed upon). For example, upon accepting an offer the player character is changed to have a particular shirt bearing a logo. In an embodiment, the appearance change or other change in player character characteristics is performed by the player.

In an embodiment, a player can agree to perform in the future an action in the real-world or in the virtual world. A penalty can be assessed or applied, e.g., for failing to perform the specified action, for failing to perform the action in a particular manner or for otherwise failing to abide by a term of an agreement. The penalty may include, e.g., payment by the player of real-world currency, of virtual currency, of virtual objects, or any other form of payment, including forms of payment described herein. In an embodiment, the penalty can be applied automatically. For example, a credit card account of the player can be charged automatically, or virtual items can be withdrawn automatically from the player character.

The penalty may include the player relinquishing the virtual item that was provided as part of the offer. For example, where 100 gold pieces were provided in exchange for agreeing to sign up for a subscription for a year, then if the player cancels the subscription (e.g., within three months), the player can be forced to forfeit the 100 gold pieces given to his character. As another example, where accepting an offer allowed a player character to complete a mission, then a penalty could be that the mission is deemed not completed.

A method involved in assessing a penalty according to an embodiment includes the following steps:
1. Determine that a condition of an offer has not been met
2. Retrieve player account
3. Remove credit for completing mission
4. Assess and charge a penalty for not fulfilling the condition of the offer In an embodiment, a player may receive a commission or other benefit in exchange for signing up other players for a third party service. For example, when a player receives an offer for a third party service, the player may choose to copy the offer and assist in providing the offer to other players.

In an embodiment, the price for an offered item can be paid in more than one form, For example, the player may have the choice of paying either in gold pieces or in U.S. dollars.

In an embodiment, the form in which the price can be paid may be specified by the data about the offer. For example, data about the offer may specify that the price can only be paid by the player performing a particular service. As another example, data about the offer may specify that the price the player pays can be any of: 100 gold pieces, US$1.00, or changing the appearance of the player character of the player.

In an embodiment, the price for an offered item is paid immediately upon acceptance of the offer. In an embodiment, the price for an offered item is paid some time after acceptance of the offer. In an embodiment, the price for an offered item is paid before the offered item is provided. In an embodiment, the price for an offered item is paid after the offered item is provided. In an embodiment, the price for an offered item is paid at the time the offered item is provided.

In an embodiment, the timing of payment may be specified by the data about the offer. For example, data about the offer may specify that the price must be paid immediately upon acceptance.

In an embodiment, the price to charge for an offered item can be specified completely by the entity that establishes the offer. In an embodiment, the price can be subject to maximums, minimums, limitations or other conditions, such as may be imposed by the game company. In an embodiment, a price may include a set of components, and one or more components can be specified by different entities.

In an embodiment, the price is a constant (e.g., US$1.00). In an embodiment, the price depends in whole or in part on one or more factors. For example, the price for a player may depend on previous purchases made by the player (e.g., the price increases with every previous offer accepted by a player). As another example, the price may depend on the player status, such as the difficultly level of a mission, whether the player is solving the mission alone or with help of other players, the skill level of the player character, the skill level of other player characters helping, how many times the player has tried and failed to complete the mission, how much time the player has spent trying to complete the mission In an embodiment, a price paid for a virtual item that is offered may be paid to an entity such as the entity providing the offer or the entity providing the virtual item. In an embodiment, portions of the price paid for a virtual item may be paid to different entities. Such portions may include a commission. Such portion may be fixed (e.g., $0.05, 10% of the price) or variable (e.g., depending on the amount of the price paid, depending on the entity providing the offer). In an embodiment a portion of the price is paid to an entity that provides the video game, an entity that manages distribution of offers to players, or an entity operating a server on which the video game runs. In an embodiment such an entity receives a portion of all or substantially all prices paid for offered virtual items.

A method involved in charging commissions according to an embodiment includes the following steps:

1. Receive an indication that an offered virtual item has been or will be used to complete a mission
2. Determine a price for the virtual item
3. Charge price to player account
4. Determine commission for the offer
5. Remit price less commission to provider of offer A method involved in the player performing an action according to an embodiment includes the following steps:

1. Receive an indication that an offered virtual item has been or will be used to complete a mission
2. Alter player character based on conditions of the offer
3. Alter player's graphical user interface based on conditions of the offer In an embodiment, a player can opt to block upsell offers altogether, so that the player would not be provided any offers though the player otherwise would have been provided with one or more offers. Similarly, in an embodiment a player may block certain types of offers from being provided to him, or permit only certain types of offers to be provided to him. For example, a player might specify that only offers for certain virtual items can be provided, or that offers requiring payment of a service by the player are to be blocked. In an embodiment, a player may specify limits on the number of offers that are provided to him, such as no more than five offers per day or no more than twenty offers ever.

In an embodiment, a player may specify that offers are not to be provided to him during the play of the video game, but are instead provided via another channel, such as via email or an in-game message system.

In an embodiment, only a predetermined number of offers (or an otherwise limited number of offers) can be provided to a particular player. For example, players may be unable to be provided more than five offers per month, or no more than twenty total.

In an embodiment, only a predetermined number of certain types of offers (or an otherwise limited number of certain types of offers) can be provided to a particular player. For example, players may be unable to be provided more than five offers per month form non-players Similarly, in an embodiment, only a limited number of offers or certain types of offers can be provided at all. For example, only a total of one hundred offers per month in total may be provided, or only a total of five offers from non-players per month in total may be provided.

With limitations on the providing of offers to players, the video game would provide offers to those players capable of being provided offers.

Limitations on offers may differ depending on the mode of play of the video game. For example, there may be limitations only in multiplayer mode but no limitations or different limitations in single player mode. There may be limitations for players that do not pay a subscription fee but no limitations or different limitations for players that pay a subscription fee.

Limitations on offers may differ depending on the time a player has spent playing the video game. For example, the limitation on the number of offers that may be provided to a player may increase (or decrease) with the number of hours the player spends playing the game, or the number of hours per week the player spends playing the game. In an embodiment, the manner in which the limitation changes can be set by the player, or can be set by a third party such as a parent of the player. For example, a parent may set the limitations such that as the player spends more hours per week playing, the number of offers that can be provided to the player increases.

In an embodiment, the ability to receive an offer can depend on the past behavior or previous status of a player character. For example, a player may be required to earn the ability to receive offers, or to receive certain kinds of offers (e.g., offers for powerful weapons, offers to complete missions). In an embodiment, a player can earn the ability to receive offers or particular types of offers by playing the video game more than a predetermined amount of time (e.g., more than 200 hours total, more than a predetermined number of hours in each of three consecutive months). In an embodiment, a player can earn the ability to receive offers or particular types of offers by accomplishing certain tasks, such as tasks in the video game.

In an embodiment, there are a limited number of offers available, or a limited number of particular kinds of offers available. There can be an auction for players to purchase the ability to receive offers or particular kinds of offers. In an embodiment, points or other currency must be or can be used by players to purchase the ability to receive offers or particular kinds of offers. Such points might be earned by players, might be purchased by players, might be created by players (and possibly redeemed by another player). Sch points could accumulate, much as certain character attributes (e.g., health, strength) in some video games accumulate with play of the video game. There can be limits on the use of points. For example, there may be limits on the amounts of points redeemed or the frequency with which points are redeemed, limits on the acquisition of points.

A method involved in limited offer availability according to an embodiment includes the following steps:
1. Receive a request for an offer
2. Determine if an offer is available based on game conditions, time conditions, player conditions, player character conditions, and/or advertiser conditions
3. Generate a price for the offered virtual item
4. Output an offer for a virtual item
5. Receive acceptance of the offer
6. Flag player character account with mission complete status based on conditions of the offer A method involved in setting offer frequency according to an embodiment includes the following steps:
1. Determine length of game session
2. Generate the appropriate number of allowable offers per unit time
3. Output offers based on the number allowable per unit time A method involved in setting offer frequency according to an embodiment includes the following steps:
1. Receive a request to change the number of allowable offers per unit time for a player account
2. Determine if requesting party is authorized to alter the settings
3. Output graphical user interface for altering the settings
4. Receive setting alterations
5. Store setting alterations with player account A method involved in offer availability according to an embodiment includes the following steps:
1. Determine that an offer is available for a mission based on conditions
2. Post the offer on an auction
3. Identify player that may want to receive the offer
4. Notify players that an offer is being auctioned
5. Receive a winning auction bid from a player
6. Make the offer available to the player with winning bid A method involved in offer availability according to an embodiment includes the following steps:
1. Receive an action from a player character that qualifies for an offer
2. Generate appropriate offer points based on action and conditions
3. Credit offer points to player character account
4. Receive a request from the player to redeem offer points to acquire an offer
5. Determine if points qualify to be used to purchase the specified offer
6. Charge offer points
7. Provide offer In an embodiment, whether a particular offer is provided to a player can be based exclusively on the criteria for that offer, such as the status of a player character. For example, where the offer is specified as being provided to a player that fails three times to kill a particular monster, then that offer can be provided to all players that fail three times to kill the particular monster.

In an embodiment, whether a particular offer is provided to a player can be based on the history of the player, such as based on the offers that the player has accepted and/or the offers that the player has rejected. For example, a particular offer may be specified as being provided only to players who have previously accepted at least two offers. As another example, a particular offer may be specified as being provided only to players who have previously accepted at least five of a particular type of offer. As another example, a particular offer may be specified as being provided only to players who have accepted offers from a particular merchant.

In an embodiment, an entity can specify an offer and details about the offer by entering various data via a user interface (e.g., a graphical user interface) into a module or device that receives and records data specifying such offers. For example, such data may be entered via a user interface (e.g., an HTML form in a web browser, a custom application) running on a device (e.g., a personal computer) operated by an entity such as an adverser or a player. The device in turn can transmit the data to a video game system or a component thereof (e.g., to a server that runs the video game), or the device can otherwise make the data available to the video game system when required (e.g., when an offer must be provided). The data can include, for example, files to be uploaded, text entered in fields of forms, data selected from menus or other controls of a graphical user interface, hyperlinks to further URLs or other data.

In an embodiment, the user interface permits an entity to enter data which specifies a plurality of similar offers. For example, data may specify that a plurality of offers are specified by: the same text of the offer, the same virtual item to be offered, and the same price to be paid for the virtual item, but that each of the plurality of offers is triggered by a different player character status. In an embodiment, where a set of information is to be used to specify more than one offer, the user interface permits that set of information to be saved and applied to different offers as directed by the entity.

In an embodiment, an entity may need to qualify to be permitted to create offers which are to be provided. In an embodiment, an entity may need to pay a fee, e.g., for creating offers, for each offer provided, for each offer accepted. The amount of such a fee can be, e.g., fixed, a fixed amount per offer, or a percentage of the value received by the entity from accepted offers.

In an embodiment, the user interface or another software-based system permits the performance of offers to be measured. For example, a user interface can output, for an offer, performance measurements such as the number of times the offer was provided, the number of times the offer was accepted, the percentage of times the offer was accepted, the total of all virtual items provided in exchange for acceptances of the offer, the total value received from acceptances of the offer. In an embodiment, the performance of a plurality of offers (e.g., all offers of an entity) can be aggregated and output.

In an embodiment, a video game server or another device can record the aggregate performance of all offers, e.g., the number of all offers that are provided, accepted, rejected, acceptance rate of all offers. Such performance measurements may be subdivided by time (e.g., acceptance rate in the month of August), by type of offer (e.g., offers to provide a particular kind of virtual item, offers triggered by a particular kind of player status), by type of player (e.g., by age or address of player), by player character (e.g., by skill level), by time the offer is provided.

Such performance measurements might be made available, e.g., to advertisers, players, other entities, perhaps for a fee. Performance data could be used to assist in setting the price to charge for virtual items that are offered. For example, data on acceptance rates of previous offers can illuminate which amounts players are in general unwilling to pay. Performance data could be used to specify the price to charge for virtual items that are offered. For example, there can be a prevailing 'market price' for a particular virtual item that is offered (e.g., the highest price for which more than 50% of offers for the virtual item were accepted), and offers can specify that the market price is used is offers for that virtual item. Market prices can vary based on, e.g., locations in the virtual world, server running the video game, status of the player character, characteristics of players.

What is claimed is:

1. An apparatus comprising:
a processor, and
a memory in communication with the processor,
in which the memory stores instructions that, when executed by the processor, direct the processor to perform a process comprising:
running a massive multi player online game that is operable to simultaneously support a plurality of players via a plurality of video game devices,
in which each of the players controls one or more respective player characters;
in which the players are able to interact with each other in the game;
receiving, from each of a plurality of devices, a respective set of data that specifies
a respective offer,
a respective objective in the game,
a respective virtual item,
a respective price to pay for the virtual item, and
a respective second player to pay for the virtual item;
storing each of the plurality of sets of data as an entry in a database;
determining that a player character in the game has failed more than a predetermined number of times to achieve an objective in the game;
searching the database of entries for an entry that specifies the objective that the player character has failed to achieve;
locating an entry in the database that specifies the objective that the player character has failed to achieve;
providing, to a first player that corresponds to the player character, the offer that is specified by the located entry;
receiving from the first player an acceptance of the offer;
charging a credit card account of the first player for payment of the price that is specified by the located entry;
providing at least part of the price to the second player that is specified by the located entry;
providing to the player the virtual item that is specified by the located entry.

2. The apparatus of claim 1, in which determining that a player character in the game has failed more than a predetermined number of times to achieve an objective in the game comprises:
determining that a player character in a video game has failed more than a predetermined number of times to transition to a subsequent level in the game.

3. An apparatus comprising:
a processor, and
a memory in communication with the processor,
in which the memory stores instructions that, when executed by the processor, direct the processor to perform a process comprising:
running a massive multi player online game that is operable to simultaneously support a plurality of players via a plurality of video game devices,
in which each of the players controls one or more respective player characters;
in which the players are able to interact with each other in the game;
determining that a first player character in the game has a particular status in the game;
in which determining that a first player character in the game has a particular status in the video game comprises:
determining that a first player character in the game has failed more than a predetermined number of times to achieve an objective in the game;
searching a database of entries for an entry that specifies the particular status of the first player character, in which each entry specifies:
a respective offer,
a respective status of a player character in the game,
a respective virtual item,
a respective price to pay for the virtual item, and
a respective second player to pay for the virtual item;
locating an entry in the database that specifies the particular status of the first player character;
providing, to a player corresponding to the first player character, the virtual item that is specified by the located entry; and
charging the player corresponding to the first player character for the price that is specified by the located entry.

4. A process performed by a computer, the process comprising:
running, by the computer, a massive multi player online game that is operable to simultaneously support a plurality of players via a plurality of video game devices,
in which each of the players controls one or more respective player characters;
in which the players are able to interact with each other in the game;
receiving, by the computer, from each of a plurality of devices, a respective set of data that specifies
a respective offer,
a respective objective in the game,
a respective virtual item,
a respective price to pay for the virtual item, and
a respective second player to pay for the virtual item;
storing, by the computer, each of the plurality of sets of data as an entry in a database;
determining, by the computer, that a player character in the game has failed more than a predetermined number of times to achieve an objective in the game;
searching, by the computer, the database of entries for an entry that specifies the objective that the player character has failed to achieve;
locating, by the computer, an entry in the database that specifies the objective that the player character has failed to achieve;
providing, by the computer, to a first player that corresponds to the player character, the offer that is specified by the located entry;
receiving, by the computer, from the first player an acceptance of the offer;
charging, by the computer, a credit card account of the first player for payment of the price that is specified by the located entry;
providing, by the computer, at least part of the price to the second player that is specified by the located entry;
providing, by the computer, to the player the virtual item that is specified by the located entry.

5. The process of claim 4, in which determining that a player character in the game has failed more than a predetermined number of times to achieve an objective in the game comprises:
determining that a player character in a video game has failed more than a predetermined number of times to transition to a subsequent level in the game.

* * * * *